July 29, 1969     G. L. AHLSTEDT     3,457,978
METHOD AND APPARATUS FOR CUTTING LOGS INTO LUMBER AND
RECOVERING THE BYPRODUCTS
Filed Aug. 15, 1967     2 Sheets-Sheet 1
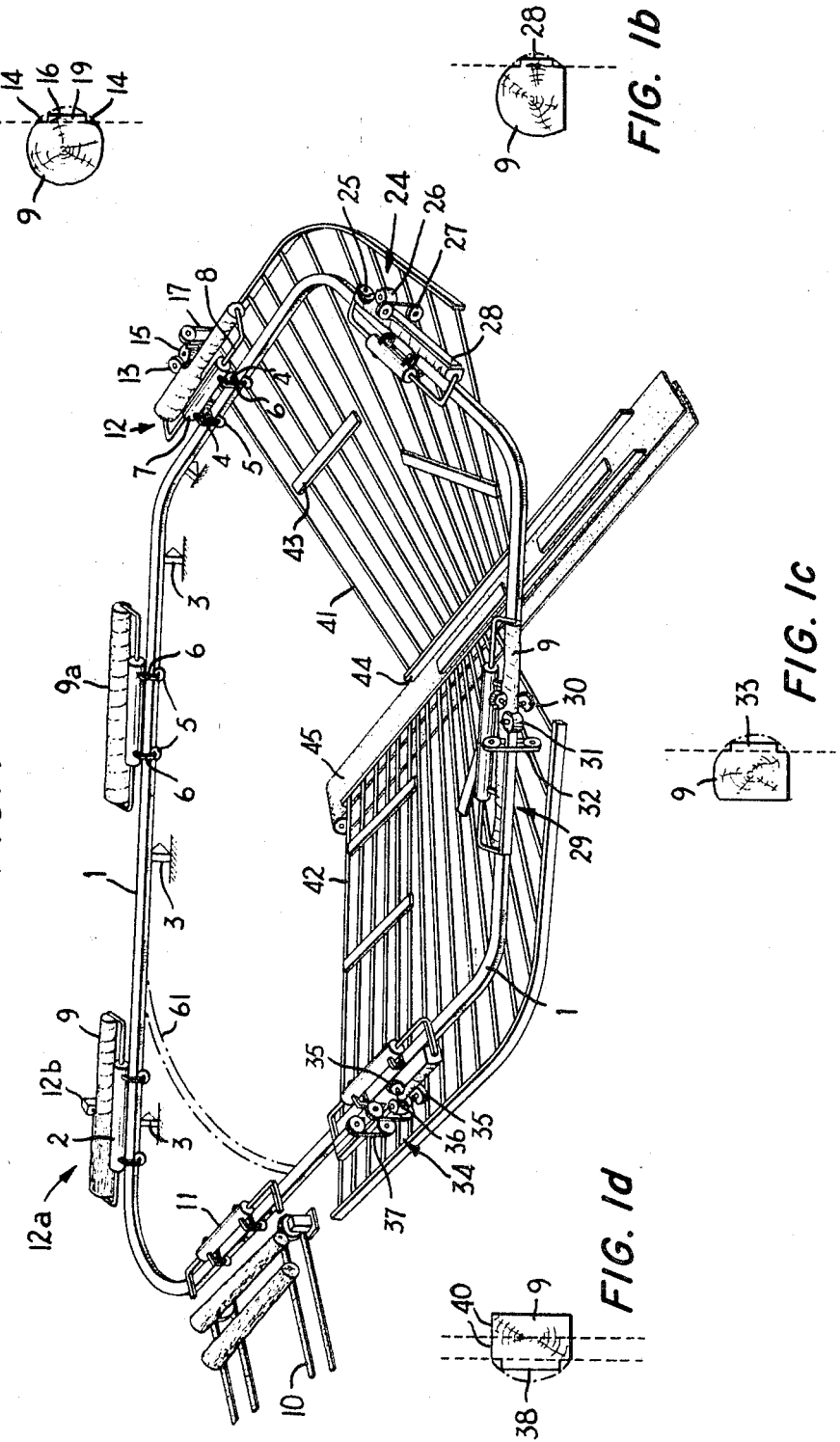

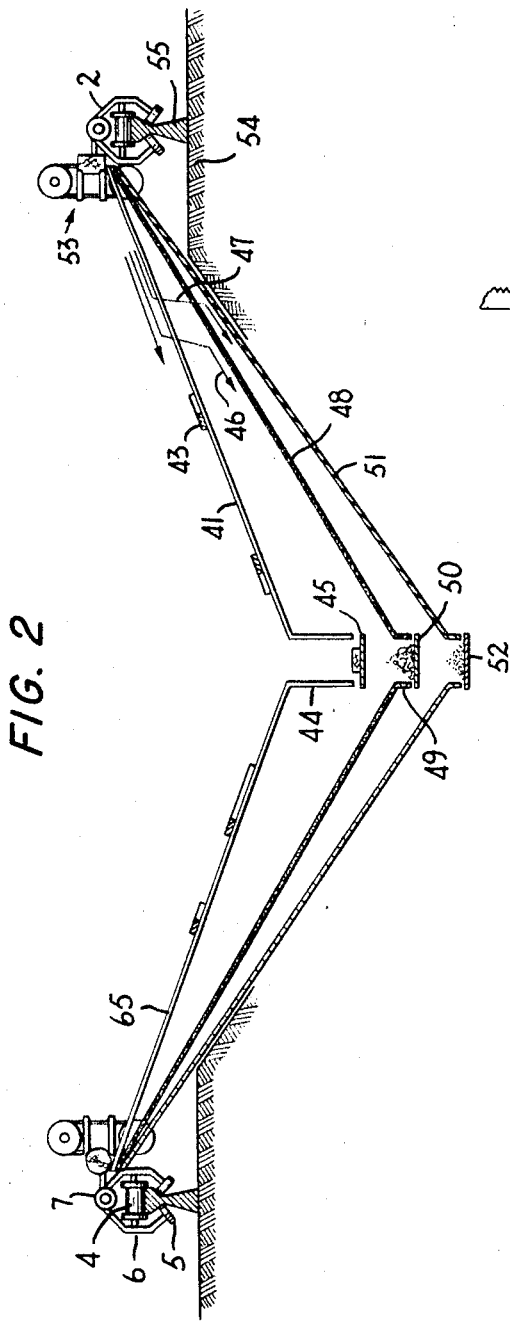
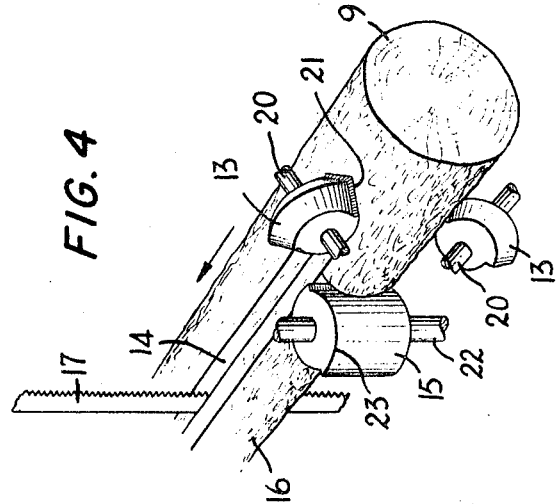
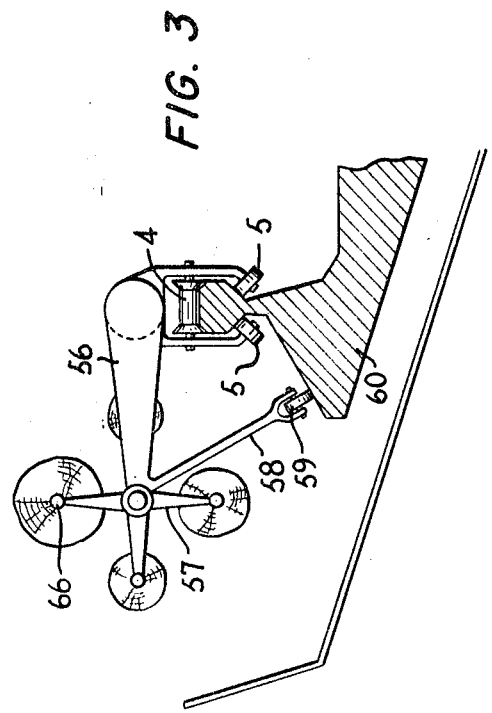

3,457,978
METHOD AND APPARATUS FOR CUTTING LOGS INTO LUMBER AND RECOVERING THE BYPRODUCTS
Gunnar Lennart Ahlstedt, Alfredshem, Sweden, assignor to Mo och Domsjo Aktiebolag, Ornskoldsvig, Sweden, a corporation of Sweden
Filed Aug. 15, 1967, Ser. No. 660,818
Claims priority, application Sweden, Nov. 7, 1966, 15,204/66
Int. Cl. B27c *9/00;* B27b *1/00;* B07c *13/00*
U.S. Cl. 144—312              20 Claims

ABSTRACT OF THE DISCLOSURE

A process and apparatus for reducing logs into useful wood products such as lumber, chips and sawdust, collecting the products and sorting them according to size and shape are provided by this invention. The logs are cut into lumber, chips and sawdust as they are conveyed to a series of milling and sawing tools. The chips, planks, and sawdust fall from the processing tools to a common collecting and sorting station which comprises several separators remove the coarsest wood product from the collection and allow the remaining products to fall through to a lower separator for further sorting.

---

This invention relates to a method and apparatus for cutting logs into lumber, and separating and recovering the byproducts, and more particularly, it relates to a method and apparatus for cutting logs into lumber, in a sequence of two or more cutting operations at different sites, collecting and commingling the useful byproducts from the plurality of sites, and sorting out and then collating such products according to size and/or shape.

In cutting logs into boards, planks, beams, and the like, a large amount of scrap including, for example, pieces of bark, wood shreds, chips and sawdust, is formed. Nowadays, due to the low profit margins on lumber, it is necessary to make use of these products too. Thus, it is desirable to collect the scrap as well as the lumber, and they find application in chipboard, pulp board, cellulose pulp, and cellulose derivatives.

The log-converting apparatus and processes now commonly employed in saw mills cut the logs in a series of cutting operations at a plurality of stages, and are not well suited for the recovery of small scrap pieces, such as chips and sawdust. Recovering the byproducts requires expensive hand labor due to the necessity of collecting them at each of the sawing and milling stages along the route in the conversion of the logs, and then sorting them by size and shape.

The instant invention provides a method and a compact apparatus for converting logs into lumber and scrap, collecting and commingling the products, and then sorting and separating the scrap according to size and shape, all automatically, and with a minimum of labor and expense. The instant apparatus in more readily automated and controlled than the apparatus known to the prior art, and it is easily supervised by a minimum number of personnel.

The instant invention also provides a process for reducing logs into useful wood products, such as lumber, chips, and sawdust, comprising, reducing the logs into useful products in stages at a plurality of log-processing stations, collecting the processed products in one place and simultaneously sequentially removing, according to size, a selected product from the collection.

The apparatus of the instant invention provides a plurality of means for reducing logs into useful wood products, such as lumber and scrap products, such as shreds, chips, and sawdust, in a series of cutting operations at a plurality of locations, collecting the products from all such means in one place, and sorting and separating the products according to size and shape.

The apparatus accordingly comprises, in combination, means for conveying a plurality of logs in a predetermined log-processing circuit; a plurality of log-processing stations along the circuit, adapted in sequential combinations to reduce the logs into wood products; means for conveying the wood products separate from the log at each station to a common collector station; and a plurality of collecting and separating means associated with the collecting station to separate the products according to size; and means for delivering the size-sorted products.

The logs are reduced into planks, beams, boards, chips and sawdust in this invention, preferably by transporting them along a track from one processing station to the next. The track is laid out in a predetermined circuit and the plurality of log-processing stations therealong are normally disposed adjacent to the track. The circuit is preferably laid out in a closed path that is generally curvilinear, e.g., circular, ovoid, etc. The circuit, in fact, need not be in any regular shape and can be adapted to suit any layout of a particular log-processing mill. The circuit could even be an up- and back-circuit along two or more adjacent tracks.

The track itself can be a dual-rail, multi-rail, or monorail track. A mono-rail track is preferred. It is also possible, however, to transport the logs around the circuit by a conveyor belt, or the like, and a track need not be used. Means for securely holding the log in position can be provided to ensure that the log does not move during the cutting operation so that the boards, planks and beams are evenly cut from the logs.

If a track is used, the instant assembly will include at least one log carrier which runs along the track and is adapted to carry the logs from one processing station to another. The carrier should naturally be appropriate to the type of track used, and in the preferred embodiment, the carrier is adapted to run on a mono-rail track.

The carrier can be adapted to carry one or more logs and is normally provided with means for picking up, as well as holding and rotating the logs between positions for procesing on all sides during their transport about the circuit. These means can be arms, grippers, cradles, or the like. They can be automatically or manually controlled and driven by any of the appropriate drive mechanisms known to those skilled in the art. In one embodiment, the apparatus employs a plurality of carriers, each adapted to carry a plurality of logs.

The processing stations can be disposed on either side or on both sides of the track. Such processing stations normally include sawing, milling, and debarking apparatus, which are well known to those skilled in the art. The processing apparatus normally produce wood chips and sawdust byproducts in the production of boards, or planks. The details of the conveyor and processing stations will be more particularly described below.

In the preferred embodiment of this invention, the means for conveying the wood products to a collection station after they are cut from the log, and the collecting and separating means are combined. However, if desired, they can be separate and independent mechanisms. For example, the conveying means can be a belt conveyor, an inclined trough, a chute, or the like which receives the planks, wood chips, and sawdust together, as they are cut from a log and carries them to a collecting and separating mechanism. One suitable separating mechanism is a plurality of sieves, grates, screens, and the like, diposed one above the other in sequence, according to the opening size.

The uppermost of these separators preferably is the coarsest and thus adapted to separate the coarsest products from the collection, and permit the remaining chips and sawdust to fall through to the next separator. The chips and sawdust can be separated by the next separator.

In the preferred embodiment, the combined means for conveying, collecting and separating the processed wood products comprises one or more inclined separators disposed one beneath another and all beneath the processing stations. The separators are sieve-like devices which slope to a common discharge point. Each of the separators can either occupy the entire area within the space enclosed by the track, or can be divided into a plurality of surfaces, each occupying only a limited area directly beneath the processing stations.

If straight tracks are used and an enclosed path is not defined thereby, then the separator can occupy the space between the two or more straight tracks. The separators generally should extend slightly beyond the track to collect wood chips and particles which are thrown a short distance from the processing station beyond the track.

The uppermost of these inclined separators can be in the form of a surface formed as a grid or grate, or a plurality of spaced rods or arms. The space between the rods or arms should be of a size adapted to retain the coarsest or most gross size products of the wood thereon, such as the planks or boards, and permit the finer or smaller wood products, such as sawdust and wood chips, to fall through to the next separator.

The next sloping separator can also comprise a grid, grate or screen that has openings of a size adapted to retain and separate the wood chips from the sawdust, and the lowermost sloping separator can comprise a solid sheet which collects the sawdust, and any remaining wood particles.

It is to be noted that as many or as few inclined separators as desired can be provided. However, two separators are normally a minimum. The preferred number of separators is three, since the wood products can normally be classified into three general categories; planks, or boards; chips; and sawdust. However, if finer classifications and separation according to size of, for example, wood chips is desired, more than three sloping separators can be provided.

Each of the separators can be provided with a conveyor belt at the lowermost or discharge point to receive the separated wood products.

It is possible to provide vibrating apparatus associated with the sloping separators to vibrate them to assist the wood products in sliding along the sloping surfaces to assist the passage of the smaller particles therethrough to the lower separators.

It is also within the scope of this invention to provide combined conveying, collecting and separating means which are not inclined. These can be of the same type as the separators described above, and can collect and separate the wood products in the same manner. However, the removal of the wood products from the surface in this case would be carried out by periodically sweeping or otherwise removing the products from the surfaces. One other method of removing the products is to tip the separator or cause it to slope only for certain limited removal or cleaning periods.

Another combined conveying, collecting and separating mechanism could also comprise several conveyor belts formed of screens, or sieve-like materials. These belts are disposed one above the other and beneath the track, in position to receive the wood products as they are cut. The separation of the products occurs in the same manner as that described immediately above.

It is also possible to provide means other than sieve-like gravity operated separators for collecting and separating the wood products. For example, a collection trough could be provided for collecting the wood products as they are cut. An air jet separator can be associated with the trough to direct a stream of air against the products to separate the products according to their size. The combination of the collecting trough and the air jet separator can comprise the collecting and separating means of this invention.

The operation of the preferred embodiment is as follows. Logs are carried by the conveyors around the track to the processing stations, where they are reduced into useful wood products, such as planks, boards, sawdust and chips. These wood products fall from the processing stations as they are separated from the logs onto the sloping separators, where they are commonly collected. The largest or coarsest wood products, such as the boards and planks, will be retained on the first sloping separator and will slide therealong to a discharge point. The smaller particles, such as the sawdust and chips will fall through the first separator onto a second separator which collects the remaining wood products and removes all or a selected portion thereof, determined by their size. These particles slide down this sloping separator to a discharge point, and are removed therefrom. Another such separator can be provided, if desired.

This invention will be more particularly described in connection with the following drawings in which:

FIGURE 1 is a schematic view in perspective of an apparatus for reducing logs into useful wood products in accordance with this invention;

FIGURES 1a, 1b, 1c, 1d show various stages in the processing of logs at different positions on the track of the apparatus of this invention;

FIGURE 2 is a view in cross-section of the apparatus, shown in FIGURE 1;

FIGURE 3 is an enlarged view in cross-section of a log-conveyor suitable for use in this invention, and adapted to carry a plurality of logs; and FIGURE 4 is a view in perspective of a log being processed by tools in a typical processing station of the instant invention.

The apparatus of FIGURE 1 comprises a T-beam monorail track 1, following a closed curvilinear circuit and having a plurality of log carriers 2 thereon. The track is supported by a plurality of suitable supports 3. The carriers 2 run in a clockwise direction along the track. Each carrier has two flanged running wheels 4, which run on top of the track and two sets of guide wheels 5, which engage the sides of the rail to guide the carrier thereon. The carriers are driven along the track automatically by a drive mechanism, such as electric motors. Each carrier has two log support frames 6, which themselves are supported on the guide wheels, and support the log carrying mechanism.

The log carrying mechanism comprises a cylindrical body 7, having L-shaped arms 8, which project therefrom, to engage the ends of a log. The body 7 houses a drive mechanism, such as a hydraulic piston and cylinder arrangement for extending the arms 8 to accommodate logs of different lengths. The end portions of the arms 8 are provided with grippers, such as tail stocks, which can seize a log 9 at both ends and hold it in a secure and preferably horizontal position for transport from one processing station to the next and release any remaining portions of the log after processing. These grippers can also be adapted by the provision of a suitable drive mechanism to rotate the log for processing on different sides at different stations. The drive mechanism can be hydraulic, gear operated or the like, and can be electrically or mechanically actuated. Such mechanisms are well known to those skilled in the art.

In the assembly shown in FIGURE 1, a log feeder 10 is disposed adjacent to the track for the delivery of logs to each log conveyor on the track. The log feeder can be a device similar to that disclosed in U.S. Patent No. 1,031,059 to Edwards.

The logs can be fed to an empty carrier by automatically actuating the feeders when an empty carrier is adjacent to it. This can be accomplished by employing the appropriate sensing apparatus which are known to those skilled in the art.

Conveying arms 8 are constructed such that when a log conveyor is empty, they are extended to their outermost position and then automatically move inwardly to grip a new log when it lies between them. This operation can be actuated by the same sensing apparatus as used to actuate the feeder. The operation of the feeding assembly and pick-up apparatus can also be done by manual actuation of switches controlling the gripping and drive mechanisms.

A plurality of log-processing stations are disposed adjacent to the track for cutting the logs into useful wood products. On such processing stations can be a log debarking station 12a. Such a station can comprise a bark cutting tool 12b, which can be brought into contact with a log when it is adjacent thereto. The log can then be rotated as it is past the cutting tool 12b to remove the bark. Such an operation can be seen at 9 in FIGURE 1. A debarked log is shown on the track at position 9a.

A processing station suitable for the first cutting of the log into planks is shown at 12. Similar subsequent processing stations are shown at 24, 29 and 34. The successive stages in the cutting of the planks and boards, at 12, 24, 29 and 34, can be seen by reference to FIGURES 1a, 1b, 1c, and 1d, respectively.

The cutting apparatus at each station is substantially the same and is shown in FIGURE 4. It comprises two rotating bevel cutters 13 mounted on inclined shafts 20. These cutters are generally frustoconical in shape and have V-shaped cutting edges 21 which cut right-angle channels 14 into the log to square off the top and bottom edges of the plank that is next to be cut. A cutter 15 which rotates upon a vertically disposed shaft 22 and has a straight cutting edge 23, is disposed adjacent to the log and in a position to form a flat surface 16 on one side of the log, to form one side of the plank to be cut out. The surface 16 is cut perpendicularly to the adjacent edges at the channel 14. A band saw 17 is located in a position to cut along the width of the plank, i.e., the end of the channel 14, to form a plank 19. This can best be seen by reference to FIGURE 1a.

The cutting tools can be adjustably mounted, so that planks or boards of uniform dimensions can be cut from each log although the size of the log may vary. The adjustment of the cutters can be carried out automatically by sensing apparatus.

The plank falls from the log and is collected beneath the processing station by the combined conveying, collecting and separating means. As the log is sawn, and surfaced, wood chips and sawdust are produced. These also fall from the processing station to the conveying, collecting and separating means. The collection of the wood products and the separation thereof into its several components will be described below.

The log, after the removal of the plank 19, is ready for further processing, and this can be accomplished at the next processing station 24. This is also disposed adjacent to the track, and is quite similar in construction to the processing station described above. It comprises two channel cutters 25, a surface cutter 26, and a band saw 27. Prior to processing at station 24, the log is rotated through an angle of 90° by a rotary drive mechanism in the grippers which can be the same as that used to rotate the log for debarking. At the processing station 24, the log 9 will have a plank 28 cut from it, and this can best be seen by reference to FIGURE 1b. This is done in the same manner as at the previous station 12.

A similar processing apparatus 29 is disposed further along the track at 1c. The log is once again rotated through a 90° angle prior to its reaching the processing station 29. This processing station comprises two channel cutters 30, a surface cutter 31, and a band saw 32. The log 9 has a plank 33 cut from it at the processing station 29. The operation and structure of this processing station is identical to those described above.

Further along the track, a last processing station 34 is disposed. This processing station is similar to those described above and comprises two channel cutters 35, a surface cutter 36, and a band saw 37. Another plank 38 is removed from the log 9 by this apparatus. This processing station, however, is also provided with a band saw 40, in addition to the bands saw 37. This band saw is adapted to cut the remaining portion of the log 9 into two sections 40 to form two planks. This can best be seen by reference to FIGURE 1d.

The conveyor is now free to receive another log from the log feeder 10. All of the planks and boards, sawdust and wood chips cut from the log are free to fall from each processing station of the apparatus for collection.

In the shown embodiment, the tools are mostly milling tools (cutters), as described above. This produces a majority of the scrap as chips, and only a small amount of sawdust. This is of advantage in cases where chips can be used to advantage as starting material for pulping processes.

In such cases, the economic value of the chips is considerably greater than that of the sawdust. It is within the scope of the invention, however, to effect the complete processing operation solely with sawing toools, if so desired.

The combined means for conveying the cut wood products from the processing stations, and collecting and separating the processed logs, chips and sawdust in the preferred embodiment comprises a plurality of inclined rods 65 which form separators 41 and 42 in the form of grid surfaces. These separators extend from slightly beyond the outside of the track to collect particles thrown from the cutting and milling tools to a central lowermost portion of the inclined separator, which comprises a discharge point. The inclined rods are in the form of a grate or grid, and the rods 65 are spaced to retain the planks or boards 43 thereon and permit all the remaining chips and sawdust to fall through to a lower collector and separator. The grid surfaces 41 and 42 are located beneath all the processing stations from which logs, chips, board, etc., are to be collected. This can be seen by reference to FIGURE 1.

The chips and sawdust 46 and 47 fall through the grid-like separators 41 and 42 onto a lower separator 48. This lower separator is also inclined and is a coarse screen. This screen catches the wood chips 46 and these chips slide along the screen to a central chute 49, and are deposited onto a conveyor 50. The sawdust falls through the coarse screen 48 onto a solid sheet 51, which is disposed beneath the grid-like separators 41 and 42, and the screen 48. This solid surface 51 is also inclined and the remaining sawdust slides therealong to a central chute similar to those described above, and is carried away by a conveyor 52.

As indicated above, if it is not desired to separate the sawdust from the chips, only a grid surface such as 41, 42 and a solid sheet, such as 51, need be provided.

It is to be noted that in FIGURE 2, the processing stations 53 are mounted on the inside of the tracks, and the collecting surfaces do not extend beyond the tracks, since in the embodiment the logs, wood chips and sawdust fall within the tracks, as can be seen by reference to FIGURE 2. It is not necessary to extend the conveying, collecting and separating means beyond it. The plurality of supports 3 shown in FIGURE 1 are not necessary in the embodiment shown in FIGURE 2, and the track is supported upon a continuous rail and support assembly 54 and 55.

In FIGURE 3, another embodiment of a rail and carrier assembly is shown. This embodiment is adapted to carry a plurality of logs thereon, and comprises a main arm 56, having a plurality of radial arms 57 extending therefrom with gripping members 66 on each radial arm 57 at each end thereof to grip the ends of a log.

In the embodiment shown, four logs can be carried simultaneously on the carrier. The grippers 66 are provided with suitable drive mechanisms for rotating the logs and a drive mechanism provided for moving the conveyor along the track. The carrier is also provided with a support arm 58 which projects from the main support arm 56 and has a roller 59 which runs on an outwardly projecting portion 60 of the rail. It is possible, with this construction, to either process the four logs, one after the other at each station, or to process one log sequentially on each trip around the track. In either of these cases, it may be desirable to bypass either or both of the debarking station 9 and the feeding station 11. This can be done by providing a shunt track 61 as shown in the broken lines of FIGURE 1.

Each carrier after having received four logs can be passed around the track four times, a log being worked on each lap after rotation of the arm-cross 57 through 90° for each lap. In this way, the track can be made less dependent on irregularities in the supply of logs, possibly occurring on the conveyor 10. Further, lack of space may make it difficult to arrange for a sufficient number of processing stations. In such a case, certain stations may be provided with tools which can be used alternately; thus logs processed by one set of tools on passing such a station may be worked by another set of tools on their next passage around. All the logs may also be worked on one side only at all stations when passing once around the plant and then, after being turned, worked on another side during the next time around, past the same stations.

In operation, logs are delivered to a carrier by the log feeder. They are then picked up and carried between processing stations around the predetermined circuit by the carrier. The logs are processed at such stations and reduced into useful wood products, such as planks, boards, wood chips, and sawdust. These products fall from the processing stations and are received by the first collecting and separating surface which collects, sorts the wood products and separates planks or boards from the chips and sawdust by retaining the planks or boards. The chips and sawdust fall through the first separator to a coarse screen which comprises a second separator for removal of wood chips, and finally, the remaining sawdust is collected upon a third collecting and separating surface, which is a solid sheet. All of the separators are preferably inclined and the wood products slide therealong onto conveyors for removal.

It is to be noted that the minor structural details of the processing stations have not been shown in the drawings or described in great detail since these can be varied to a great extent, depending upon the type of processing desired. The number, position, and type of cutting and processing tools can be varied from station to station and need not be identical to those disclosed therein. The processing stations and the tools of various types can be automated and controlled by sensing apparatus that are actuated according to the dimensions and condition of the logs. It is also possible to manually process the logs in each station, if desired.

It also should be noted that although the sawing and milling operations carried out in the instant apparatus and process have been described as taking place as the logs are conveyed to subsequent processing stations, it is also within the contemplation of this invention that the operations can be effected by holding the logs stationary relative to the cutting and milling tools and moving the tools to the logs.

The instant invention provides a method and compact apparatus for efficiently processing logs and collecting processed wood products with a minimum of labor and expense in collecting and separating wood products.

Having regard to the foregoing disclosure, the following is claimed as the inventive and patentable feature thereof:

1. An apparatus for reducing logs into useful wood products, such as lumber, chips, sawdust, and collecting the products in one place, and sorting the products according to size and shape, comprising, in combination, means for conveying a plurality of logs in a predetermined log-processing circuit; a plurality of log-processing stations along the circuit, adapted in sequential combinations to reduce the logs into wood products; means for conveying the wood products separated from the log at each station to a common collection station; and a plurality of collecting and separating means associated with the collection station to separate the products according to size; and means for delivering the size-sorted products.

2. An apparatus in accordance with claim 1, in which the means for conveying the wood products and the means for collecting and separating the products according to size comprise at least two inclined separators, disposed one above the other, the uppermost separator being adapted to remove the coarsest wood products from the collection.

3. An apparatus in accordance with claim 2, in which the inclined separators are disposed within an enclosed track, and are adapted to discharge the separated products at the lowermost point of each inclined separator to the delivery means.

4. An apparatus in accordance with claim 3, in which the delivery means are conveyors disposed to remove the separated products from the discharge points.

5. An apparatus in accordance with claim 3, in which the discharge points are located in proximity to each other.

6. An apparatus in accordance with claim 1, including a track laid out in a closed circuit.

7. An apparatus in accordance with claim 1, in which the log-processing stations comprise sawing and milling apparatus.

8. An apparatus in accordance with claim 2, including a track, and in which the separating means extends beyond the track for collecting products thrown from the processing stations.

9. An apparatus in accordance with claim 1, including three inclined separator surfaces, the uppermost surface comprising a grate for removing planks and boards from the common collection, the lowermost surface comprising a solid sheet, and the intermediate surface comprising a coarse screen.

10. An apparatus in accordance with claim 1, including a mono-rail track having log carriers running thereon, each said carrier being adapted to carry a plurality of logs.

11. An apparatus in accordance with claim 1, in which the carrier is provided with means adapted to operatively grip and hold a log, and means for rotating a log held thereon.

12. An apparatus for reducing logs into useful wood products, such as planks, boards, wood chips and sawdust, and collecting the products and separating such products according to size, comprising, in combination, a track laid down in a predetermined closed circuit; a plurality of log-processing stations therealong, disposed adjacent to the track, said stations having sawing and milling means associated therewith; a plurality of log carriers running on the track, each carrier having at least one set of arms for retaining at least one log in position thereon, and said carrier being adapted to carry a log from one processing station to another for reduction into useful wood products thereat; and at least two inclined separator surfaces mounted beneath the processing stations for receiving and commonly collecting the wood products formed at each processing station, the inclined separator surfaces being disposed one above the other, and the uppermost surface comprising a grate for removing planks and boards from the common collection, and the lowermost inclined surface comprising a generally solid sheet, adapted to receive the remainder of the processed wood products.

13. An apparatus in accordance with claim 12, in which the track is a mono-rail track.

14. An apparatus in accordance with claim 12, including a third inclined separator surface, interposed between the upper and lower inclined surfaces, said surface comprising a relatively coarse screen adapted to separate wood chips for sawdust.

15. The process for reducing logs into useful wood products, such as lumber, chips and sawdust, comprising, reducing the logs into useful products in stages at a plurality of log-processing stations, collecting the processed products in one place and simultaneously sequentially removing, according to size, a selected product from the collection.

16. A process in accordance with claim 15, in which the wood products are sawn and milled from a log.

17. A process in accordance with claim 15, including transporting a log from one processing station to another along a predetermined circuit.

18. A process in accordance with claim 15, including rotating the logs for processing on different sides thereof.

19. A process in accordance with claim 15, in which the processed wood products are sequentially removed according to size from the common collection by passing the products through a series of separating and retaining surfaces.

20. A process in accordance with claim 15, in which the log processing stations are moved to the logs to process the logs.

References Cited

UNITED STATES PATENTS

| | | | |
|---|---|---|---|
| 2,966,182 | 12/1960 | Andrus et al. | 144—176 |
| 3,070,318 | 12/1962 | Blanchard | 241—76 |

GERALD A. DOST, Primary Examiner

U.S. Cl. X.R.

144—1; 209—112; 241—68, 76